(12) United States Patent
Sethuraman et al.

(10) Patent No.: US 11,070,995 B2
(45) Date of Patent: Jul. 20, 2021

(54) METHOD FOR IOT DEVICE TO STAGGER TX AND SAVE POWER

(71) Applicant: Cypress Semiconductor Corporation, San Jose, CA (US)

(72) Inventors: Prasanna Kumar Sethuraman, Bangalore (IN); Rajendra Kumar Gundu Rao, Bangalore (IN); Ayush Sood, Bangalore (IN); Paul Strauch, Pleasanton, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 56 days.

(21) Appl. No.: 16/441,531

(22) Filed: Jun. 14, 2019

(65) Prior Publication Data

US 2020/0396625 A1    Dec. 17, 2020

(51) Int. Cl.

| H04W 24/08 | (2009.01) |
|---|---|
| H04B 17/318 | (2015.01) |
| H04W 72/08 | (2009.01) |
| H04W 52/02 | (2009.01) |
| H04B 17/336 | (2015.01) |
| H04L 29/08 | (2006.01) |
| H04W 84/12 | (2009.01) |

(52) U.S. Cl.
CPC .......... *H04W 24/08* (2013.01); *H04B 17/318* (2015.01); *H04B 17/336* (2015.01); *H04W 52/0209* (2013.01); *H04W 72/082* (2013.01); H04L 67/12 (2013.01); H04W 84/12 (2013.01)

(58) Field of Classification Search
CPC ............ H04W 24/08; H04W 52/0209; H04W 72/082; H04W 84/12; H04B 17/318; H04B 17/336; H04L 67/12
See application file for complete search history.

(56) References Cited

U.S. PATENT DOCUMENTS

| 7,245,594 B1 | 7/2007 | Esteves et al. |
|---|---|---|
| 8,321,734 B2 | 11/2012 | Kwon et al. |

(Continued)

FOREIGN PATENT DOCUMENTS

| CN | 108366414 A | 8/2018 |
|---|---|---|
| WO | 2018030764 A1 | 2/2018 |

OTHER PUBLICATIONS

Vazquez, "HARE: Supporting Efficient Uplink Multi-Hop Communications in Self-Organizing LPWANs," Sensors MDPI, Jan. 3, 2018, 35 pages.

(Continued)

*Primary Examiner* — Mohammad S Anwar (57) ABSTRACT

Disclosed are methods and systems for delaying packet transmissions over a wireless communication channel until a more favorable channel condition is detected. A device may measure a channel metric when it receives periodic beacon signals. The device may compare the channel metric against a programmed metric threshold. If the channel metric is less than the metric threshold, the device may delay the transmission of a packet until a later transmission window or transmit opportunity (TXOP) when the channel metric rises above the metric threshold, indicating the presence of a more favorable condition for transmission, or until a preconfigured timeout period elapses before the more favorable condition is found.

20 Claims, 7 Drawing Sheets

(56) References Cited

U.S. PATENT DOCUMENTS

| | | |
|---|---|---|
| 8,718,667 B2 | 5/2014 | Song et al. |
| 8,861,414 B2 | 10/2014 | Shin et al. |
| 8,902,918 B2 | 12/2014 | Huang et al. |
| 9,894,614 B2 | 2/2018 | Su et al. |
| 9,954,650 B2 | 4/2018 | Tabet et al. |
| 10,165,531 B1 | 12/2018 | Behera |
| 10,263,661 B2 | 4/2019 | Rasmussen |
| 2005/0237971 A1* | 10/2005 | Skraparlis ............. H04L 1/0618 370/329 |
| 2006/0079220 A1* | 4/2006 | Cha ........................ H04B 7/082 455/423 |
| 2006/0109815 A1 | 5/2006 | Ozer et al. |
| 2012/0224481 A1 | 9/2012 | Babiarz et al. |
| 2012/0311173 A1* | 12/2012 | Agarwal ............. H04L 43/0829 709/231 |
| 2014/0056192 A1 | 2/2014 | Meylan et al. |
| 2015/0350933 A1* | 12/2015 | Mannemala .......... H04W 76/18 370/225 |
| 2016/0255656 A1 | 9/2016 | Lou et al. |
| 2017/0223768 A1* | 8/2017 | Jain ....................... H04L 1/1887 |
| 2018/0309538 A1 | 10/2018 | Verma et al. |
| 2018/0376483 A1 | 12/2018 | Lee |

OTHER PUBLICATIONS

International Search Report of the International Searching Authority for International Application No. PCT/US2020/032964 dated Aug. 20, 2020; 9 pages.

Written Opinion of the International Searching Authority for International Application No. PCT/US2020/032964 dated Aug. 20, 2020; 2 pages.

\* cited by examiner

METHOD FOR IOT DEVICE TO STAGGER TX AND SAVE POWER

TECHNICAL FIELD

The subject technology generally relates to wireless communication systems, and more particularly, to methods and systems for devices that operate in wireless local area network (WLAN) channels to delay or stagger transmissions to save power.

BACKGROUND

WLAN systems complying with the IEEE 802.11 (WiFi™) standard are used by a wide array of devices, including increasingly by low-power Internet of things (IoT) devices to communicate sensor data and other types of information. When an IoT device wants to use WiFi™ channels to transmit, it senses if the medium is free. For example, the WiFi™ standard specifies a carrier sense multiple access (CSMA) with collision avoidance (CA) mechanism for devices operating on a given channel to coordinate transmissions among each other so that the transmissions do not collide. The IoT device may measure the energy detected in the channel to determine if there are any other transmissions. If the detected energy is more than a threshold, the IoT device assumes there is already a transmission from another device and initiates a random back-off before it attempts to contend for the channel again. If the detected energy is less than the threshold, the IoT device assumes there are no transmissions, and may grab a transmission window referred to as a transmission opportunity (TXOP) to transmit immediately. However, if the channel conditions are not good during the TXOP, the transmission may fail, forcing the IoT device to retransmit. Retransmissions increase power consumption of a transmitting device and are especially undesirable for low-power battery-operated devices like IoT devices.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Examples of various aspects and variations of the subject technology are described herein and illustrated in the accompanying drawings. The following description is not intended to limit the invention to these embodiments, but rather to enable a person skilled in the art to make and use this invention. For example, while examples, implementations, and embodiments of the subject technology are described using IoT devices operating in a WLAN system that complies with various versions of the IEEE 802.11 (WiFi™) standard, the subject technology is not thus limited and may be applicable to other types of communication devices operating in other types of WLAN systems or in a wide area network.

In one aspect of the subject technology, an IoT device may measure a channel metric when it receives periodic beacon signals transmitted by an AP of the WLAN system or when the IoT device receives a packet. The IoT device may use the channel metric to gauge how conducive the channel is to transmissions at the next available TXOP when the device has packets to transmit. For example, the IoT device may compare the channel metric against a programmed metric threshold. If the channel metric is less than the metric threshold, the IoT device may delay the transmission until a later TXOP when the channel metric rises above the metric threshold, indicating the presence of a more favorable condition for transmission. The IoT device may set a maximum time interval for delaying the transmission of a packet. By not transmitting immediately at the first available TXOP but instead delaying or staggering packet transmissions until a later TXOP when the channel condition may be more favorable within a maximum delay interval, the IoT device may reduce the probability of packet errors and the need for retransmissions. At the later TXOP with the more favorable channel condition, the IoT device may transmit at a maximum data rate supported by the improved channel condition, thereby reducing the transmission time. Because power consumption of the IoT device is heavily influenced by the time the IoT device spends transmitting, by reducing retransmissions due to packet errors and by reducing the transmission time for packets, power consumption of the IoT device is reduced. For an IoT device that only transmits occasionally and when the data to be transmitted is not time critical, delaying data transmissions until when the channel condition improves advantageously saves power without affecting the quality of service.

In one embodiment, a method for operating a communication device includes receiving by the communication device a number of beacons signals received over a shared communication channel from another device. The method includes monitoring by the communication device a channel metric based on the beacon signals. The channel metric indicates a signal quality of the shared communication device. The method includes determining a timeout period associated with a packet waiting to be transmitted over the shared communication channel. The method further includes waiting to transmit the packet until the monitored channel metric exceeds a predetermined threshold or the timeout period elapses, and transmitting by the communication device the packet over the shared communication channel. In one embodiment, the shared communication channel may be a WLAN channel that conforms to any version of the IEEE 802.11 (WiFi™) standard, the communication device may be a WLAN device, the beacons may be WLAN beacon signals, and the beacons may be received from an access point of the WLAN.

In another embodiment, a processing device is configured to implement the method for delaying the transmission of a packet over the shared communication channel until the monitored channel metric exceeds a predetermined threshold or the transmission waiting time associated with the packet elapses is disclosed. The method may be implemented by a controller. The processing device may include one or more antennas configured to transmit or receive over the shared communication channel.

Figure 1:
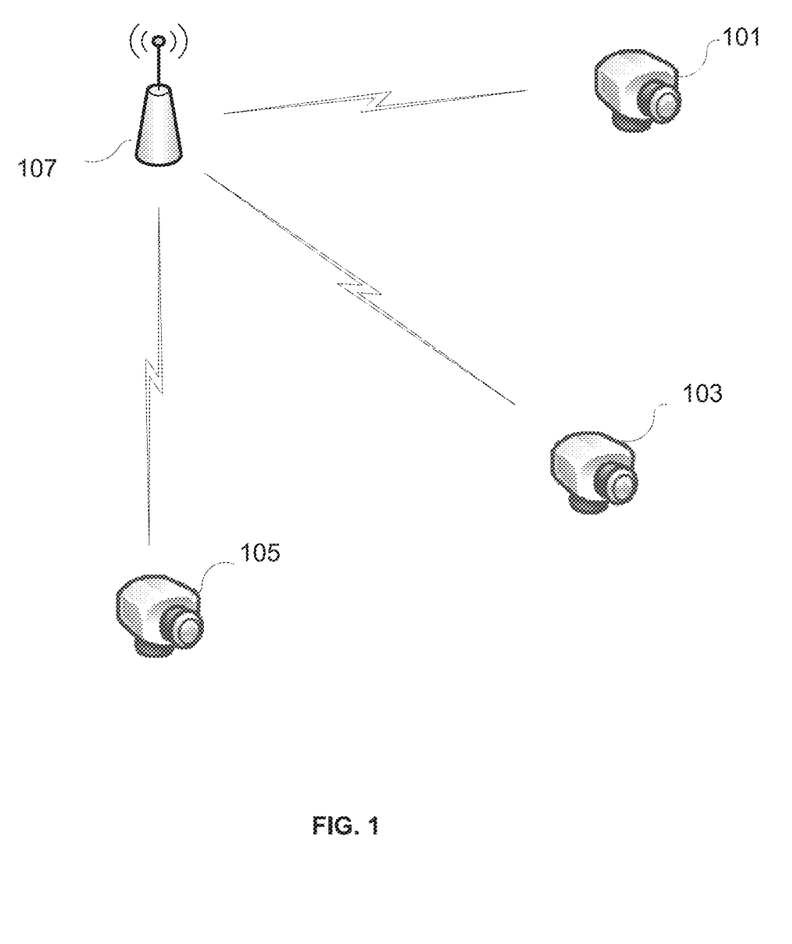
FIG. 1 illustrates an example of a WLAN system in which a number of IoT devices share a communication channel to communicate with an access point (AP), in accordance with some embodiments of the present disclosure.

FIG. 1 illustrates an example of a WLAN system in which a number of IoT devices share a communication channel to communicate with an access point (AP), in accordance with some embodiments of the present disclosure. The WLAN system may be any version of the IEEE 802.11 (WiFi™) standard. IoT devices 101, 103, and 105 are user equipment, also referred to as user stations (STAs), that are configured to associate with an AP 107. In one embodiment, the IoT devices 101, 103, 105 may be sensors configured to make measurements or gather information of an environment, such as IP security cameras that capture videos of a surrounding area. The IoT devices 101, 103, 105 and the AP 107 may form a basic service set (BSS). Once associated with the AP 107, the IOT devices 101, 103, 105 may receive commands from the AP 107 and may transmit measurement data to the AP 107.

The IoT devices 101, 103, 105 may implement the CSMA-CA mechanism specified by the WiFi™ standard to coordinate transmissions among each other on a given channel so that the transmissions don't collide. For example, the IoT devices 101, 103, 105 may measure the energy in the channel to detect if there are any other transmissions. The IoT devices 101, 103, 105 may have an energy detect (ED) block that measures the signal power on the channel and if it is below a threshold, the channel is assumed free and a transmission window referred to as a TXOP is available for use. If the measured signal power is above the threshold, the IoT devices 101, 103, 105 assume that there is already a transmission from another device and initiate a random back-off counter. The IoT devices 101, 103, 105 may wait until the random back-off counter times out before attempting to detect if there is a TXOP. In one embodiment, when the IoT devices 101, 103, 105 receive packets from the AP 107, the devices may decode the SIG field in the packets to determine the length of the packets, and may wait until after the end of the received packets to detect the TXOP. The AP 107 may transmit a periodic beacon signal at a beacon interval to synchronize the IoT devices 101, 103, 105 as well as other devices associated with the AP 107.

Figure 2:
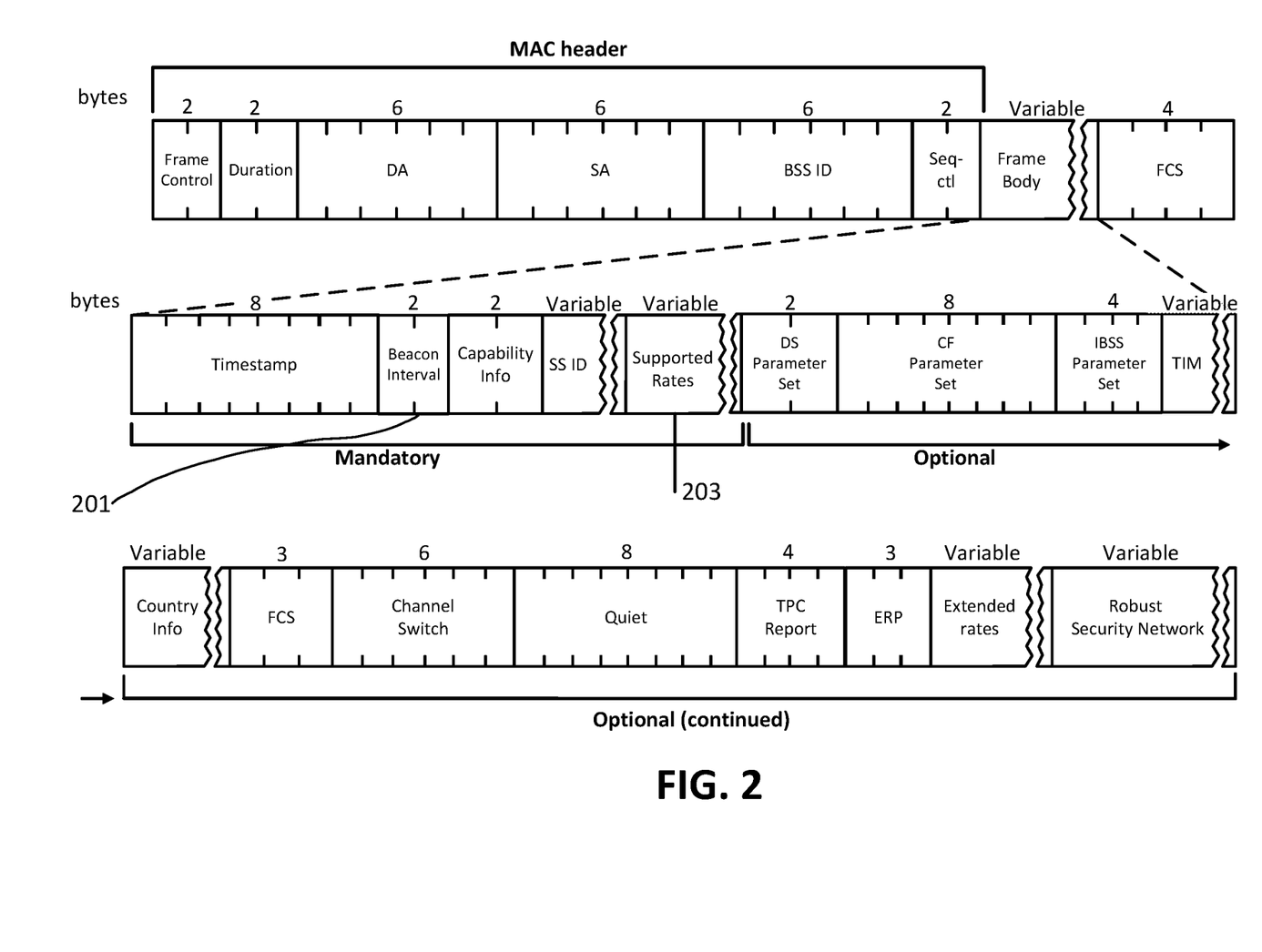
FIG. 2 shows a frame structure of a beacon in the IEEE 802.11 (WiFi™) standard.

FIG. 2 shows a frame structure of a beacon in the IEEE 802.11 (WiFi™) standard. The AP 107 may transmit the beacon with a period configured by a 2-byte beacon interval field 201 of the frame structure. In one embodiment, the beacon interval may be between 20 ms to 1000 ms. A supported rates field 203 of the frame structure may be configured with the supported data rates of the beacon to ensure that the data rates are supported by the STAs receiving the beacon. In one embodiment, the beacon may support a basic data rate of 1 Mbps in the 2 GHz band and 6 Mbps in the 5 GHz band. The AP 107 may transmit one beacon frame using the IEEE 802.11 (WiFi™) packet structure at the configured beacon interval and the data rate to the IoT devices 101, 103, 105.

To reduce power consumption, when there are no data to transmit, the IoT devices 101, 103, 105 may enter a power save mode. For example, the IoT devices 101, 103, 105 may send to the AP 107 a null data packet (NDP) with power save (PS) bit set to 1 to inform the AP 107 that the devices are ready to enter the power save mode. The IoT devices 101, 103, 105 may initialize a timer and may enter the power save mode during which the devices keep only the timer and some low level functions alive. The timer allows the IoT devices 101, 103, 105 to periodically wake up at the beacon interval to receive the beacon to check if there are any packets queued at the AP 107 for the devices. If there are packets intended for the devices, the IoT devices 101, 103, 105 may transmit a NDP with the PS bit set to 0 to enable the AP 107 to transmit the packets to the devices. Otherwise, the IoT devices 101, 103, 105 may reinitialize the timer and may reenter the power save mode until it wakes up at the expiration of the next beacon interval.

During the time the IoT devices 101, 103, 105 wake up at the beacon interval to receive the beacon, the devices may measure channel metrics while receiving the beacon to determine the condition of the receive (Rx) channel. For example, the devices may measure such metrics as the receive signal strength indicator (RSSI), adjacent channel interference (ACI), signal to noise ratio (SNR), noise level, channel condition number that indicates the quality of the channel matrix of a multiple-in multiple-out (MIMO) channel, eigen values of the channel matrix, etc. In one embodiment, the IoT devices 101, 103, 105 may measure the channel metrics while receiving the beacon even when the devices do not enter into, and need to wake up, from the power save mode. In one embodiment, the IoT devices 101, 103, 105 may measure the channel metrics of an Rx channel when the devices receive data packets, not just the beacons, from the AP 107.

The IoT devices 101, 103, 105 may use the measured channel metrics associated with the Rx channel as an approximation of the channel metrics associated with the Tx channel based on assumed reciprocity of the Rx/Tx channels. In one embodiment, the IoT devices 101, 103, 105 may use the channel metrics to stagger its Tx by waiting until better channel conditions become available or until the expiration of a preconfigured delay period. The channel metrics may be used to determine the highest modulation coding scheme (MCS) of transmission supported by the channel condition associated with the channel metrics.

Figure 3:
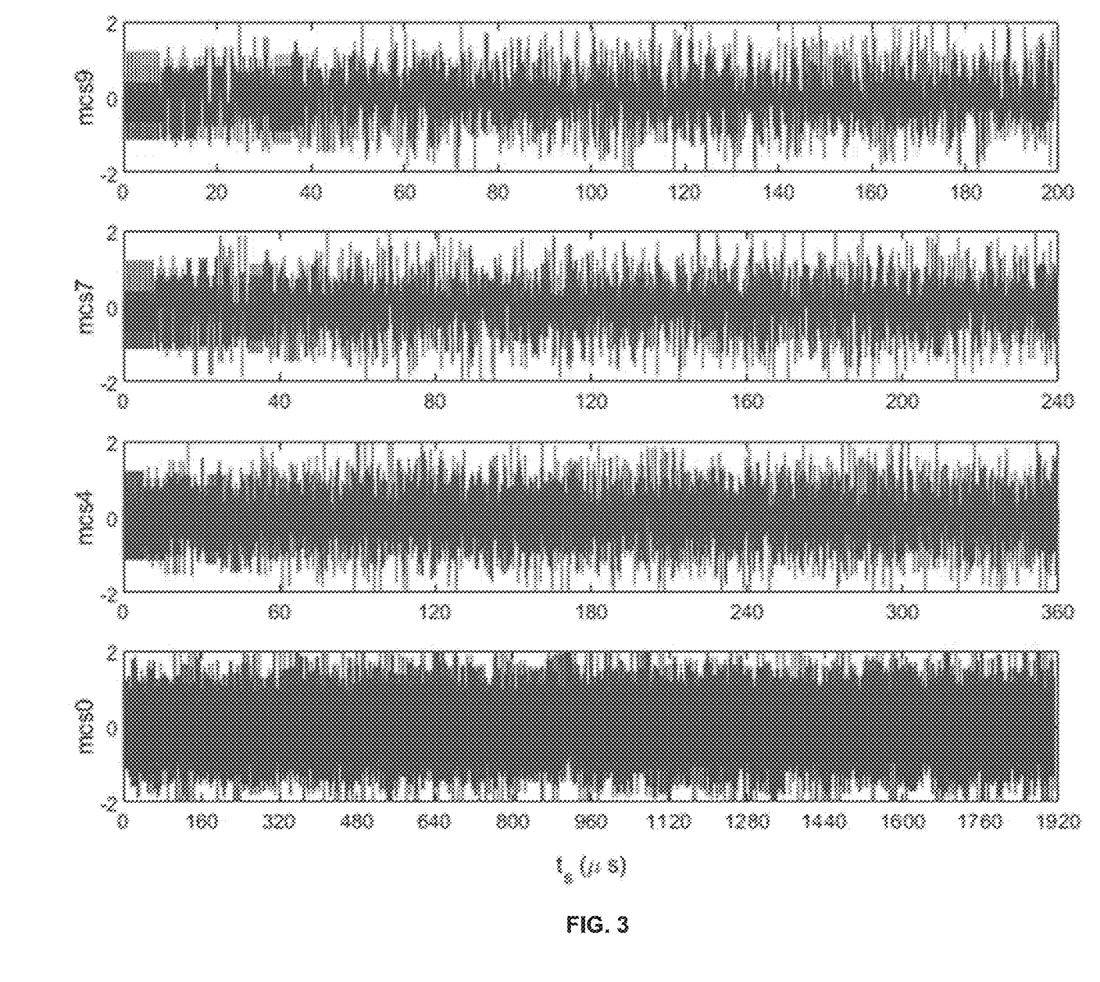
FIG. 3 shows the duration of a packet of 2K bytes in an 802.11ax compliant WiFi™ system when the packet is transmitted using different MCS.

FIG. 3 shows the duration of a packet of 2K bytes in an 802.11ax compliant WiFi™ system when the packet is transmitted using different MCS. In general, a packet modulated and coded with a higher MCS is shorter in length than a packet with a lower MCS for the same number of bytes in the packet. Since the current consumed by the devices is almost the same for all MCS, a shorter packet length results in power savings. For example, between MCS9 and MCS7 in an 802.11ax compliant WiFi™ system for a packet size of 2K bytes, the packet length of the MCS9 is 200 µs, which is about 20% shorter than the packet length of 240 µs of the MCS7. By delaying the transmission of the packet even though the channel metrics indicate that the channel condition supports MCS7, and by waiting until when channel metrics indicate that the channel condition supports MCS9 to transmit the packet using MCS9 instead of MCS 7, the IoT devices 101, 103, 105 may derive a 20% power saving due to the shorter packet length and the resulting shorter transmission duration.

In another example, the packet length of the MCS4 is 360 μs in an 802.11ax compliant WiFi™ system for a packet size of 2K bytes. Between MCS9 and MCS4, the packet length of the MCS9 is about 50% shorter than that of the MCS4. By delaying the transmission of the packet from a channel condition that supports MCS4 to one that supports MCS9 so that the packet may be transmitted using MCS9 instead of MCS4, the IoT devices 101, 103, 105 may reduce the power consumption of the packet transmission by a half.

In one embodiment, the IoT devices 101, 103, 105 may use a MCS less than the highest MCS supported by the channel condition as indicated by the channel metrics to increase the likelihood of successfully transmitting the packet on the first transmission. For example, by delaying the transmission of the packet from a channel condition that supports MCS7 to one that supports MCS9, but choosing to transmit the packet using MCS8 instead of the higher MCS9, the probability of a successful transmission on the first try is increased if the channel condition degrades slightly from the time when the channel metrics were measured. Reducing the transmission duration or reducing the probability of retransmissions due to lost packets reduces power consumption and allows the IoT devices 101, 103, 105 to go back to the power save mode sooner.

In one embodiment, the IoT devices 101, 103, 105 may compare a channel metric against a programmed threshold. If the channel metric is less than the programmed threshold, the IoT devices 101, 103, 105 may delay the transmission of a packet even if a TXOP is available and may wait until the channel condition is more conducive to transmission. For example, the IoT devices 101, 103, 105 devices may buffer the packet until the channel metric exceeds the threshold. This is possible because the IoT devices 101, 103, 105 may only need to occasionally transmit packets and the packets may not be timing critical. For example, an IP security camera that wakes up periodically to capture video need not transmit it immediately to the AP 107 if the IP security camera has enough memory to buffer the packets. In one embodiment, a packet such as a media access control (MAC) service data unit (MSDU) from the IoT devices 101, 103, 105 has a lifetime, e.g., 100-200 ms, associated with it. The IoT devices 101, 103, 105 may delay the transmission of the MSDU packet until the end of the lifetime without incurring any penalty.

Figure 4:
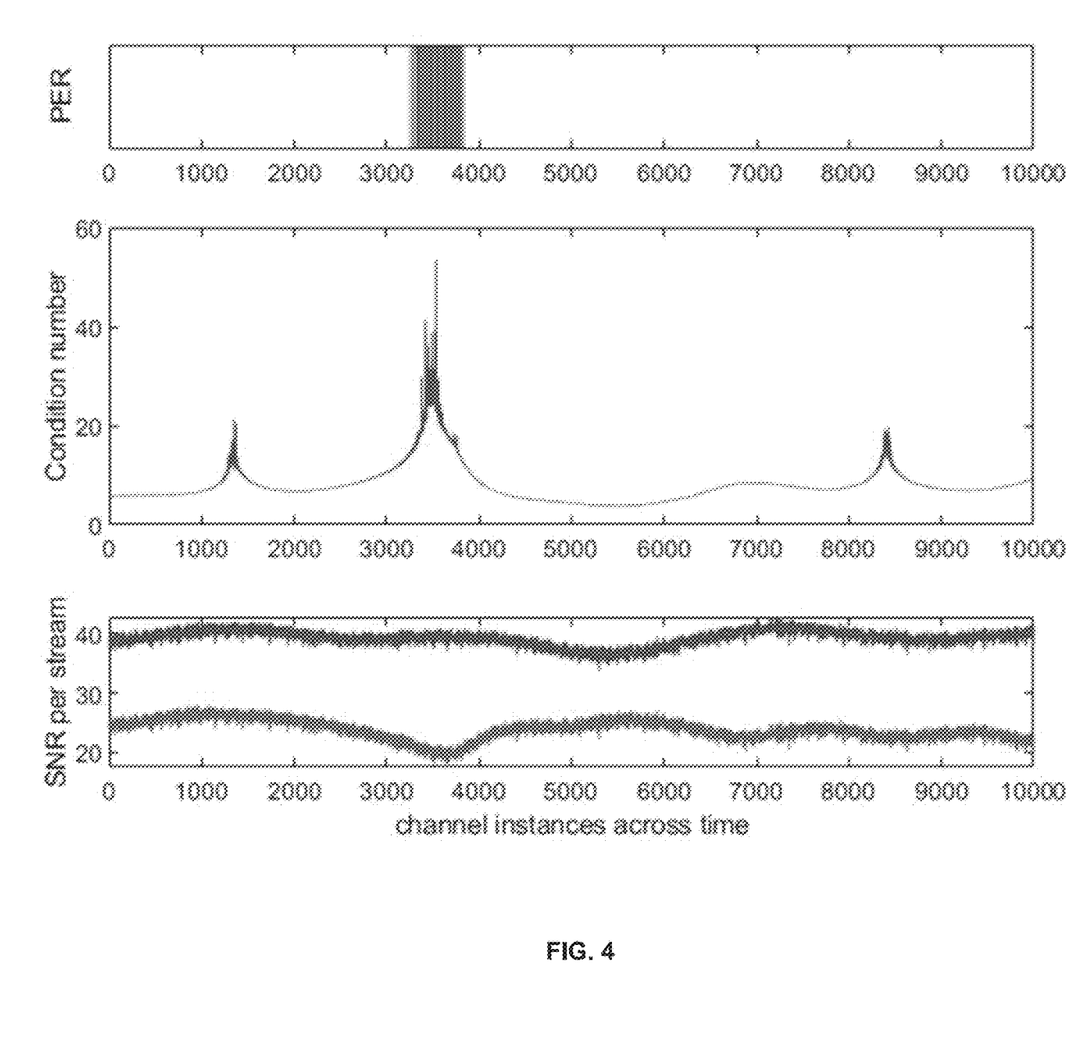
FIG. 4 illustrates a scenario of the change of the channel condition over time as measured by the channel metrics.

FIG. 4 illustrates a scenario of the change of the channel condition over time as measured by the channel metrics. The IoT devices 101, 103, 105 may measure the SNR and the condition number as channel metrics to determine the condition of the channel as shown in the lower two charts of FIG. 4. The top chart shows the packet error rate (PER) for transmissions using MCS7. During the period between 3000-4000 ms, the SNR drops and the condition number spikes, indicating a degradation of the channel condition. During this period, the PER shows a high probability of packet error. When the IoT devices 101, 103, 105 detect such channel metrics, rather than transmitting at a lower MCS or risking packet errors and retransmissions, if the devices stagger packet transmission by about 100 ms, the devices may find that the channel condition has improved. The IoT devices 101, 103, 105 may then transmit at the higher MCS7, reducing packet length and transmission time, thus saving power.

In one embodiment, the IoT devices 101, 103, 105 may have a timeout counter that is based on the MSDU lifetime. For example, the timeout counter may be programmed to have an interval that is a few ms less than the MSDU lifetime. The timeout counter may be used to indicate the maximum amount of time to delay the transmission of the MSDU packet while the devices wait for a better channel condition. While the IoT devices 101, 103, 105 search for a desired channel condition, the timeout counter counts down to indicate the remaining time of delay. If the IoT devices 101, 103, 105 do not find the desired channel condition when the timeout counter times out, the devices may transmit the MSDU packet at the next available TXOP so that the packet is transmitted within the lifetime of the MSDU even when the channel metric does not exceed the programmed threshold. In one embodiment, the IoT devices 101, 103, 105 may reduce the MCS used to transmit the MSDU packet based on the time averaged channel metrics to reduce the likelihood of retransmission. However, before the timeout counter times out, the IoT devices 101, 103, 105 may buffer the MSDU packet while waiting for the better channel condition that can support higher MCS. When the IoT devices 101, 103, 105 finds such a channel as indicated by the channel metric, the device may transmit the MSDU packet at the next available TXOP using the highest MCS associated with the channel metric.

In one embodiment, the programmed threshold may be programmed as a function of the history of the measured channel metrics, the amount of data to be transmitted, and the timeout counters associated with the buffered data. For example, if the history of the measured channel metrics indicates that the channel metrics are unlikely to exceed a certain level during a certain time of the day, the IoT devices 101, 103, 105 may program the programmed threshold to not exceed the given level during the given time period so that packets are not unduly buffered waiting for a channel condition that is unlikely to occur. In one embodiment, if there are a large number of buffered packets indicating that the current programmed threshold may be set too high and the timeout counters associated with the buffered data are nearing timeout, the IoT devices 101, 103, 105 may lower the programmed threshold to increase the likelihood that the measured channel metric may exceed the programmed threshold.

In one embodiment, the programmed threshold may be programmed as a function of the relative packet length associated with the different MCS and the last measured channel metric. For example, if the last measured channel metric indicates a channel condition that supports MCS4 and because the packet length using MCS9 is 50% shorter than the packet length using MCS4 in a 802.11ax compliant system, the IoT devices 101, 103, 105 may program the programmed threshold to the channel metric that supports MCS9 due to the 50% power saving that may be realized. In another example, if the last measured channel metric indicates a channel condition that supports MCS8 and because the packet length using MCS9 is only a few percentage shorter than the packet length using MCS8 in a 802.11ax compliant system, the IoT devices 101, 103, 105 may decide not to program the programmed threshold to the channel metric that supports MCS9 to avoid running the risk that the channel condition may deteriorate from the last measured channel metric while waiting to realize a small power saving. Thus, there is a trade-off between potential power savings by waiting for the channel condition to improve to a programmed threshold and a risk that the channel condition may actually degrade, causing the packets to be transmitted at a lower MCS or risking retransmissions.

Figure 5:
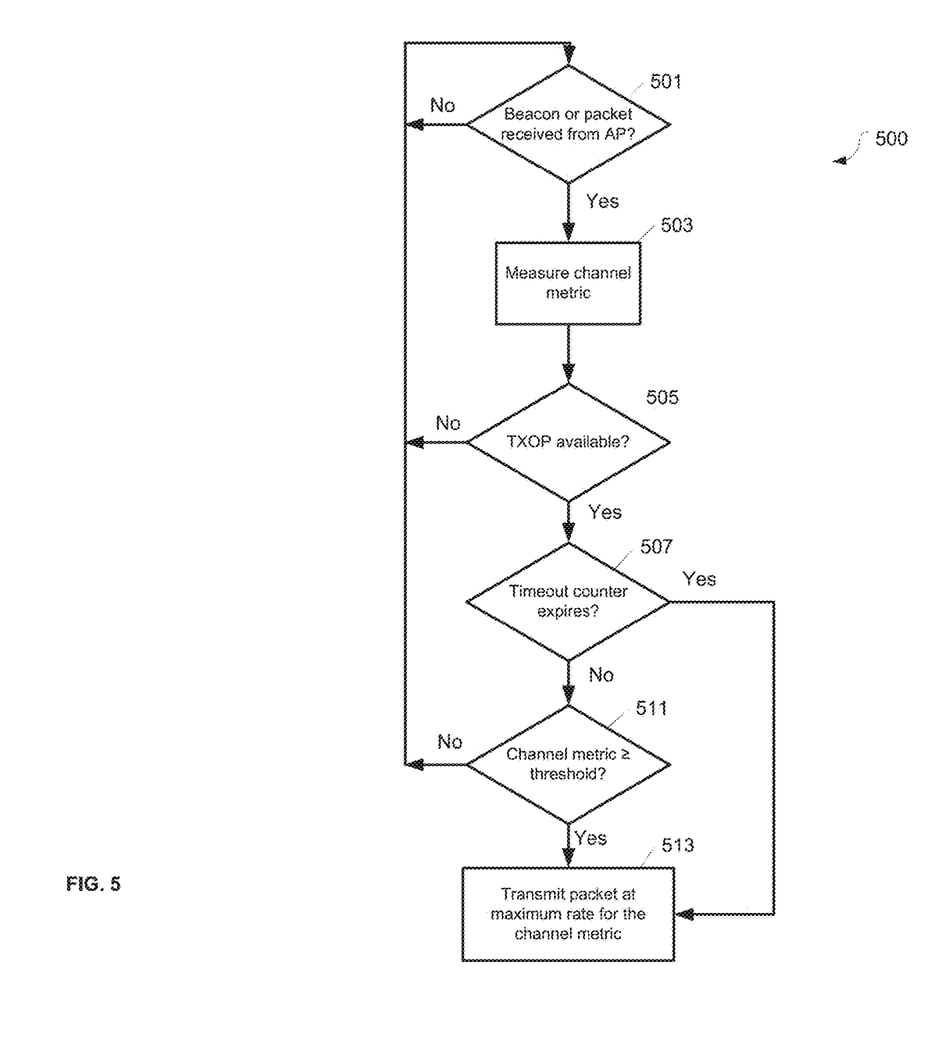
FIG. 5 illustrates a flow chart of a method for an IoT device to measure channel conditions of a WLAN channel to delay or stagger transmissions, in accordance with some embodiments of the present disclosure.

FIG. 5 illustrates a flow chart of a method 500 for an IoT device to measure channel conditions of a WLAN channel to delay or stagger transmissions, in accordance with some embodiments of the present disclosure. Method 500 may be performed by processing logic that may comprise hardware (e.g., circuitry, dedicated logic, programmable logic, a processing device, etc.), software (e.g., instructions running/executing on a processing device), firmware (e.g., microcode), or a combination thereof. In some embodiments, method 500 may be performed by an IoT device (e.g., IoT devices 101, 103, 105 illustrated in FIG. 1).

At operation 501, the IoT device may determine if it receives a periodic beacon or an Rx packet from an AP, such as the AP 107 of FIG. 1. In one embodiment, the IoT device may be in a power save mode and may periodically wake up at the beacon interval to receive the beacon. The IoT device may receive the beacon to determine if there is any packet queued at the AP for the IoT device. If there is a packet for the IoT device, the IoT device may prompt the AP to transmit the packet to the IoT device. The IoT device may also determine if it has any packet to transmit. If the IoT device has a packet to transmit, the IoT device may buffer the packet and may initialize a timeout counter with a value that indicates the maximum amount of time to delay the transmission of the packet. The timeout counter may decrement to keep track of the delay remaining before the packet is to be transmitted. If there are no packets to receive or transmit, if the IoT device has received all of the packets from the AP, or if the IoT device does not receive a beacon, the IoT device may go back to the power save mode until it wakes up to receive the next beacon.

At operation 503, during the time the IoT device receives the beacon or the packet from the AP, the IoT device may measure channel metrics to determine the condition of the Rx channel. In one embodiment, the IoT device may measure one or more of the RSSI, ACI, SNR, noise level, channel condition number, eigen values of the channel matrix, etc., associated with the Rx channel when the IoT device receives the beacon or the packet. The IoT device may use the measured channel metrics associated with the Rx channel as an approximation of the channel metrics and thus an indication of the channel condition at the next TXOP.

At operation 505, the IoT device may determine if a TXOP is available if there is a packet to transmit. In one embodiment, the IoT device may measure the signal power on the channel and may compare the measured signal power with a detection threshold. If the measured power on the channel is above the detection threshold, there is an existing transmission on the channel from the AP or another IoT device. The IoT device may declare that the TXOP is not available and may initialize a random back-off counter. The IoT device may wait until the random back-off counter times out to check if another TXOP is available or may wait to receive the next beacon at operation 501.

If the measured power on the channel is below the detection threshold, it is assumed that a TXOP is available for the IoT to transmit the packet. At operation 507, the IoT device may check to see if the timeout counter that keeps track of the time remaining before the packet is to be transmitted has expired. For example, the timeout counter may have been initialized with a value based on the lifetime of the MSDU packet when the MSDU packet was buffered. When the timeout counter counts down to zero, it means that the buffered MSDU packet should be transmitted at the currently available TXOP to prevent the lifetime of the MSDU packet from expiring.

At operation 513, if the timeout counter has expired, the IoT device may transmit the buffered packet at the maximum MCS associated with the measured channel metric. In one embodiment, the IoT device may transmit the buffered packet at a MCS less than the maximum MCS associated with the last measured channel metric or a time averaged channel metric to reduce the likelihood of a transmission failure because the channel condition at the TXOP has deteriorated from the time of the last channel metric measurement. The MCS associated with a given channel metric may be selected based on a maximum tolerated packet error rate. The higher the channel metric indicating better channel condition, the higher the MCS that may be used to transmit a packet, shortening the packet length and the transmission time, resulting in power saving of the IoT device.

If the timeout counter has not expired, the packet may afford to wait longer in the hope of obtaining a better channel condition. At operation 511, the IoT device may compare the channel metric against a programmed threshold to determine if a desired channel condition associated with the channel metric indicated by the programmed threshold is available. In one embodiment, the programmed threshold may indicate the channel metric that can support transmission of packets using the highest MCS. For example, in a 802.11 ax compliant system, the programmed threshold may be associated with the channel condition that may support MCS9. In one embodiment, the programmed threshold may be dynamically adjusted when the IoT device performs the tradeoff between delaying packet transmission in the hope of obtaining better channel condition and running the risk that waiting too long may necessitate transmitting at the first available TXOP even when the channel condition is not favorable in order to transmit within the lifetime of the packet.

If the channel metric is less than the programmed threshold, the IoT device may continue to wait for a better channel condition by going back to the power save mode until it wakes up to receive the next beacon at operation 501. If the channel metric is greater than or equal to the programmed metric, the desired channel condition has been detected, and the IoT device may transmit the buffered packet at the maximum MCS associated with the measured channel metric. The higher measured channel metric allows transmission of the buffered packet using a higher MCS, shortening the transmission time, avoiding retransmission, and saving power.

Figure 6:
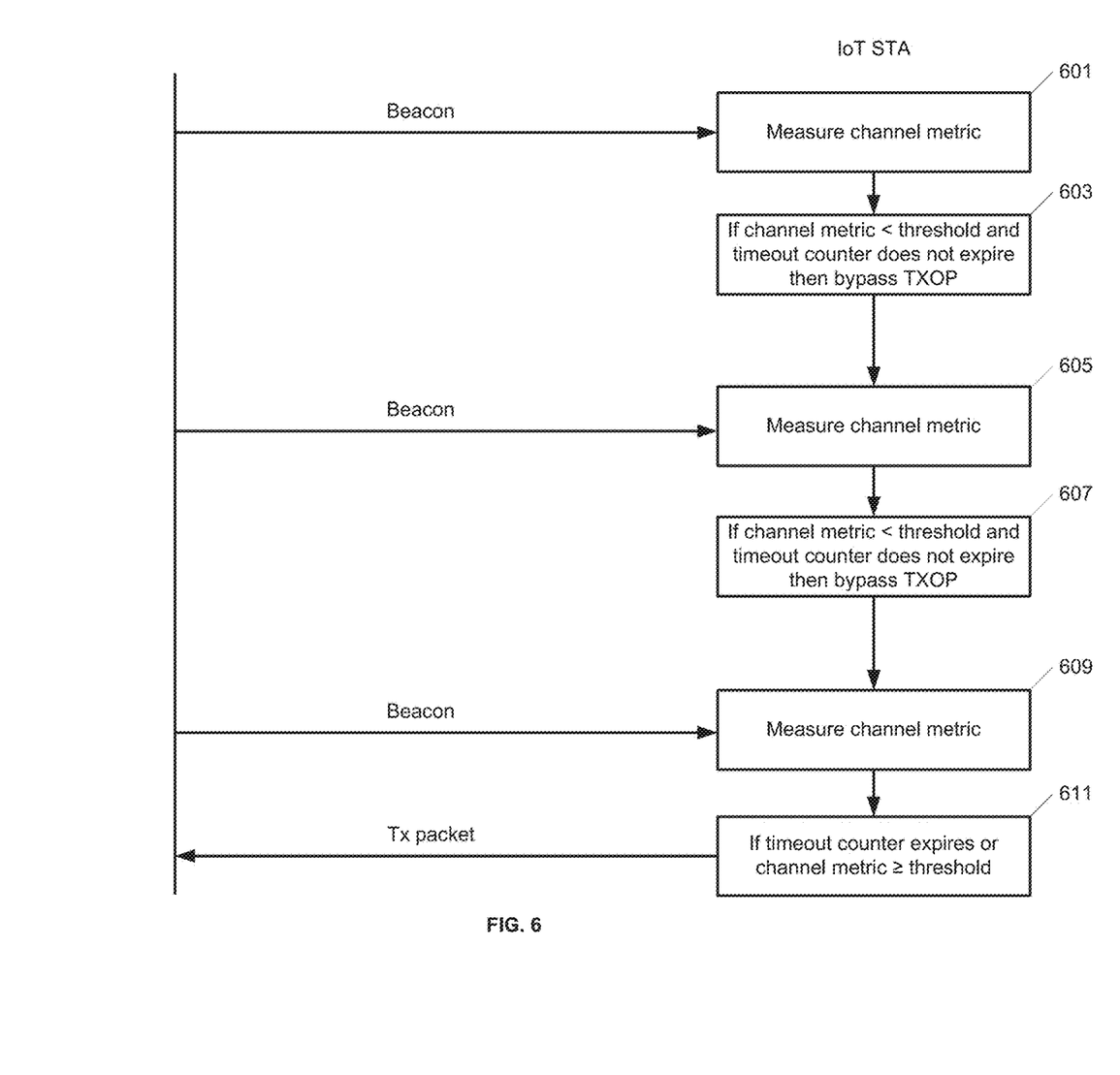
FIG. 6 is a call flow diagram of an IoT device that measures a channel metric of a WLAN channel based on periodic beacon signals from an AP to delay or stagger transmissions, in accordance with some embodiments of the present disclosure.

FIG. 6 is a call flow diagram of an IoT device that measures a channel metric of a WLAN channel based on periodic beacon signals from an AP to delay or stagger transmissions, in accordance with some embodiments of the present disclosure. The AP may transmit a periodic beacon. At block 601, the IOT device measures the channel metric during the reception of the beacon. At block 603, the IoT device compares the measured channel metric against a programmed threshold to see if the channel condition improves. The IoT device also determines if the timeout counter that keeps track of the time remaining before a buffered packet is to be transmitted indicates that the buffered packet can afford to wait longer for the improved channel condition. The IoT device determines that the channel metric is less than the programmed threshold and the timeout counter has not timed out. As a result, the IoT device does not transmit using the currently available TXOP in the hope of obtaining better channel condition at a future TXOP.

At the next beacon from the AP, the IoT repeats the channel metric measurement at block 605. At block 607, the IoT again compares the measured channel metric against a programmed threshold and determines if the timeout counter has not timed out. The channel condition still has not improved and the timeout counter has not timed out. The IoT device again does not transmit using the currently available TXOP in the hope that the channel condition improves at the next TXOP.

At the next beacon from the AP, the IoT repeats the channel metric measurement at block 609. At block 611, the IoT determines that the channel metric is greater than the programmed threshold or if the timeout counter has timed out. The IoT device transmits the buffered packet at the currently available TXOP using the maximum MCS associated with the measured channel metric.

Figure 7:
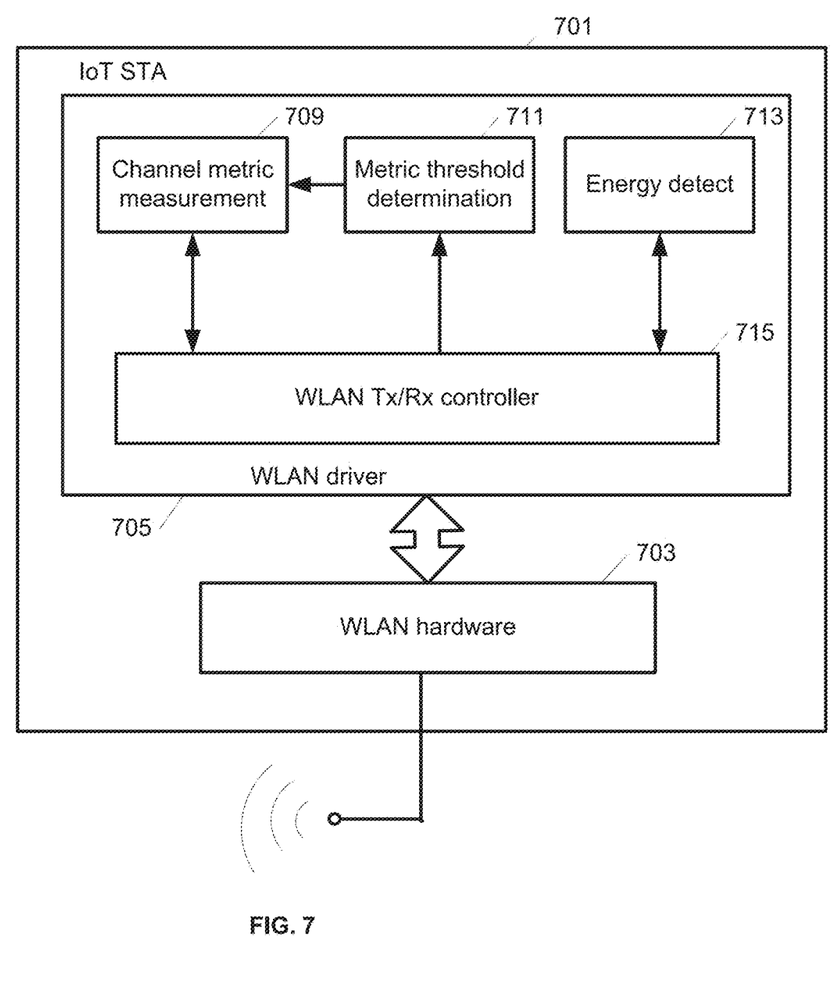
FIG. 7 is a block diagram of an IoT device that measures the channel metric of a WLAN channel to delay or stagger transmission, in accordance with some embodiments of the present disclosure.

FIG. 7 is a block diagram of an IoT device 701 that measures the channel metric of a WLAN channel to delay or stagger transmission, in accordance with some embodiments of the present disclosure. The IoT device 701 may be the IoT device 101, 103, 105 of FIG. 1.

The IoT device 701 may include the WLAN hardware 703 and the WLAN driver 705. The WLAN driver 705 may include the WLAN Tx/Rx controller 715, channel metric measurement module 709, metric threshold determination module 711, and channel energy detect module 713. The channel metric measurement module 709 may be configured to measure the channel metric during the reception of a beacon or a packet. The metric threshold determination module 711 may be configured to determine the programmed the metric threshold against which the channel metric is compared to determine if a desired channel condition is detected. The energy detect module 713 may be configured to detect if a TXOP is available by measuring the signal power on the channel and comparing the measured signal power with a detection threshold. The WLAN Tx/Rx controller 715 may be configured to control the various modules and to buffer transmit packets in performing the operations of the method of FIG. 2. The WLAN hardware 703 may be configured to receive the beacon and to transmit the buffered packet using the maximum MCS associated with the measured channel metric.

In one embodiment, the IoT device 701 may include a memory and a processing device. The memory may be synchronous dynamic random access memory (DRAM), read-only memory (ROM)), or other types of memory, which may be configured to store the code to perform the function of the WLAN driver 705. The processing device may be provided by one or more general-purpose processing devices such as a microprocessor, central processing unit, or the like. In an illustrative example, processing device may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device may also comprise one or more special-purpose processing devices such as an application specific integrated circuit (ASIC), a field programmable gate array (FPGA), a digital signal processor (DSP), network processor, or the like. The processing device may be configured to execute the operations described herein, in accordance with one or more aspects of the present disclosure, for performing the operations and steps discussed herein.

Unless specifically stated otherwise, terms such as "receiving," "generating," "verifying," "performing," "correcting," "identifying," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette) optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions. The machine-readable medium may be referred to as a non-transitory machine-readable medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Also, the terms "first," "second," "third," "fourth," etc., as used herein are meant as labels to distinguish among different elements and may not necessarily have an ordinal meaning according to their numerical designation. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of operating a wireless local area network (WLAN) device, comprising:
   receiving, by the WLAN device, a plurality of beacon signals transmitted by an access point (AP) over a WLAN channel;
   monitoring, by the WLAN device, a channel metric indicative of a signal quality of the WLAN channel based on the plurality of beacon signals;
   determining, by the WLAN device, a timeout period associated with a packet to transmit;
   waiting, by the WLAN device, to transmit the packet until the channel metric exceeds a predetermined threshold within the timeout period or otherwise when the timeout period elapses; and
   after the channel metric exceeds the predetermined threshold within the time period or the time period elapses, transmitting, by the WLAN device, the packet over the WLAN channel, wherein transmission of the packet comprises a first transmission of the packet.

2. The method of claim 1, wherein the channel metric comprises a received signal strength indicator (RSSI) of the WLAN channel.

3. The method of claim 1, wherein the channel metric comprises a signal to noise ratio (SNR) of the WLAN channel.

4. The method of claim 1, wherein the channel metric comprises one or more of an adjacent channel interference (ACI) of the WLAN channel, a noise level of the WLAN channel, a channel condition number indicative of a quality of a channel matrix of a multiple-in-multiple-out (MIMO) channel of the WLAN channel, or eigen values of the channel matrix.

5. The method of claim 1, wherein determining, by the WLAN device, the timeout period associated with the packet to transmit comprises:
   initializing a timeout counter with a maximum time to delay transmitting the packet;
   counting down the timeout counter while the packet is waiting to be transmitted; and
   declaring the timeout period elapses when the timeout counter reaches zero.

6. The method of claim 1, further comprising:
   measuring, by the WLAN device, a signal power of the WLAN channel; and
   detecting, by the WLAN device, a transmission window in which the signal power of the WLAN channel is below a detection threshold,
   and wherein transmitting, by the WLAN device, the packet over the WLAN channel comprises transmitting the packet during the transmission window.

7. The method of claim 1, wherein transmitting, by the WLAN device, the packet over the WLAN channel comprises transmitting the packet at a highest data rate supported by the channel metric for a predetermined packet error rate.

8. The method of claim 1, wherein the predetermined threshold indicates a desired signal quality of the WLAN channel for transmitting the packet.

9. The method of claim 1, wherein the predetermined threshold is dynamically adjusted based on a plurality of channel metrics monitored based on the plurality of beacon signals.

10. The method of claim 1, further comprising:
    receiving, by the WLAN device, a packet over the WLAN channel; and
    measuring, by the WLAN device, the channel metric of the WLAN channel based on the packet.

11. A wireless local area network (WLAN) device, comprising:
    a processing device configured to:
      receive a plurality of beacon signals transmitted by an access point (AP) over a WLAN channel;
      monitor a channel metric indicative of a signal quality of the WLAN channel based on the plurality of beacon signals;
      determine a timeout period associated with a packet to transmit;

wait to transmit the packet until the channel metric exceeds a predetermined threshold within the timeout period or otherwise when the timeout period elapses; and after the channel metric exceeds the predetermined threshold within the time period or the time period elapses, transmit the packet over the WLAN channel, wherein transmission of the packet comprises a first transmission of the packet.

12. The device of claim 11, wherein the channel metric comprises a received signal strength indicator (RSSI) of the WLAN channel.

13. The device of claim 11, wherein the channel metric comprises one or more of an adjacent channel interference (ACI) of the WLAN channel, a signal to noise ratio (SNR) of the WLAN channel, a noise level of the WLAN channel, a channel condition number indicative of a quality of a channel matrix of a multiple-in-multiple-out (MIMO) channel of the WLAN channel, or eigen values of the channel matrix.

14. The device of claim 11, wherein the processing device configured to determine the timeout period associated with the packet to transmit comprises the processing device being further configured to:

initialize a timeout counter with a maximum time to delay transmitting the packet;

count down the timeout counter while the packet is waiting to be transmitted; and declare the timeout period elapses when the timeout counter reaches zero.

15. The device of claim 11, wherein the processing device is further configured to:

measure a signal power of the WLAN channel; and detect a transmission window in which the signal power of the WLAN channel is below a detection threshold, and wherein the processing device configured to transmit the packet over the WLAN channel comprises the processing device being further configured to transmit the packet during the transmission window.

16. The device of claim 11, wherein the processing device configured to transmit the packet over the WLAN channel comprises the processing device being further configured to transmit the packet at a highest data rate supported by the channel metric for a predetermined packet error rate.

17. The device of claim 11, wherein the processing device is further configured to:

dynamically adjust the predetermined threshold based on a plurality of channel metrics monitored based on the plurality of beacon signals.

18. The device of claim 11, wherein the processing device is further configured to:

receive a packet over the WLAN channel; and measure the channel metric of the WLAN channel based on the packet.

19. An wireless local area network (WLAN) device, comprising:

one or more antennas configured to transmit or receive over a WLAN channel;

a processing device configured to:

receive a plurality of beacon signals from the one or more antennas, wherein the plurality of beacon signals is received by the one or more antennas from an access point (AP) over the WLAN channel;

monitor a channel metric indicative of a signal quality of the WLAN channel based on the plurality of beacon signals;

determine a timeout period associated with a packet to transmit;

wait to transmit the packet until the channel metric exceeds a predetermined threshold within the timeout period or otherwise when the timeout period elapses; and after the channel metric exceeds the predetermined threshold within the time period or the time period elapses, transmit the packet from the one or more antennas over the WLAN channel, wherein transmission of the packet comprises a first transmission of the packet.

20. The WLAN device of claim 19, wherein the channel metric comprises a received signal strength indicator (RSSI) of the WLAN channel.

* * * * *